United States Patent [19]

White

[11] 4,284,035
[45] Aug. 18, 1981

[54] AUTOMATIC LIVESTOCK FEEDER

[76] Inventor: Wallace E. White, Rte. 2, Box 2414, Splendora, Tex. 77372

[21] Appl. No.: 113,818

[22] Filed: Jan. 21, 1980

[51] Int. Cl.³ .............................................. A01K 5/02
[52] U.S. Cl. ................................. 119/51.11; 222/413
[58] Field of Search ............ 119/51.11, 51.12, 52 AF; 222/412, 413

[56] References Cited

U.S. PATENT DOCUMENTS

| | | | |
|---|---|---|---|
| 2,525,973 | 10/1950 | Sundstrom et al. | 222/413 |
| 3,256,861 | 6/1966 | Giltner | 119/51.11 |
| 3,527,191 | 9/1970 | Kawecki et al. | 119/51.11 |

FOREIGN PATENT DOCUMENTS

| | | | |
|---|---|---|---|
| 113060 | 1/1945 | Sweden | 222/413 |
| 727530 | 4/1955 | United Kingdom | 222/413 |

*Primary Examiner*—Gene Mancene
*Assistant Examiner*—Robert P. Swiatek

[57] ABSTRACT

This feeder device, for the automatic dispensing of feed to animals, consists primarily of a feed-containing bin, to which is attached a housing on a back plate. Within the housing is mounted a motor and a timer, for dispensing feed once or twice a day, and a worm shaft is driven by the motor, that will move the feed, and let it drop through into a trough or elsewhere.

1 Claim, 4 Drawing Figures

U.S. Patent  Aug. 18, 1981  4,284,035
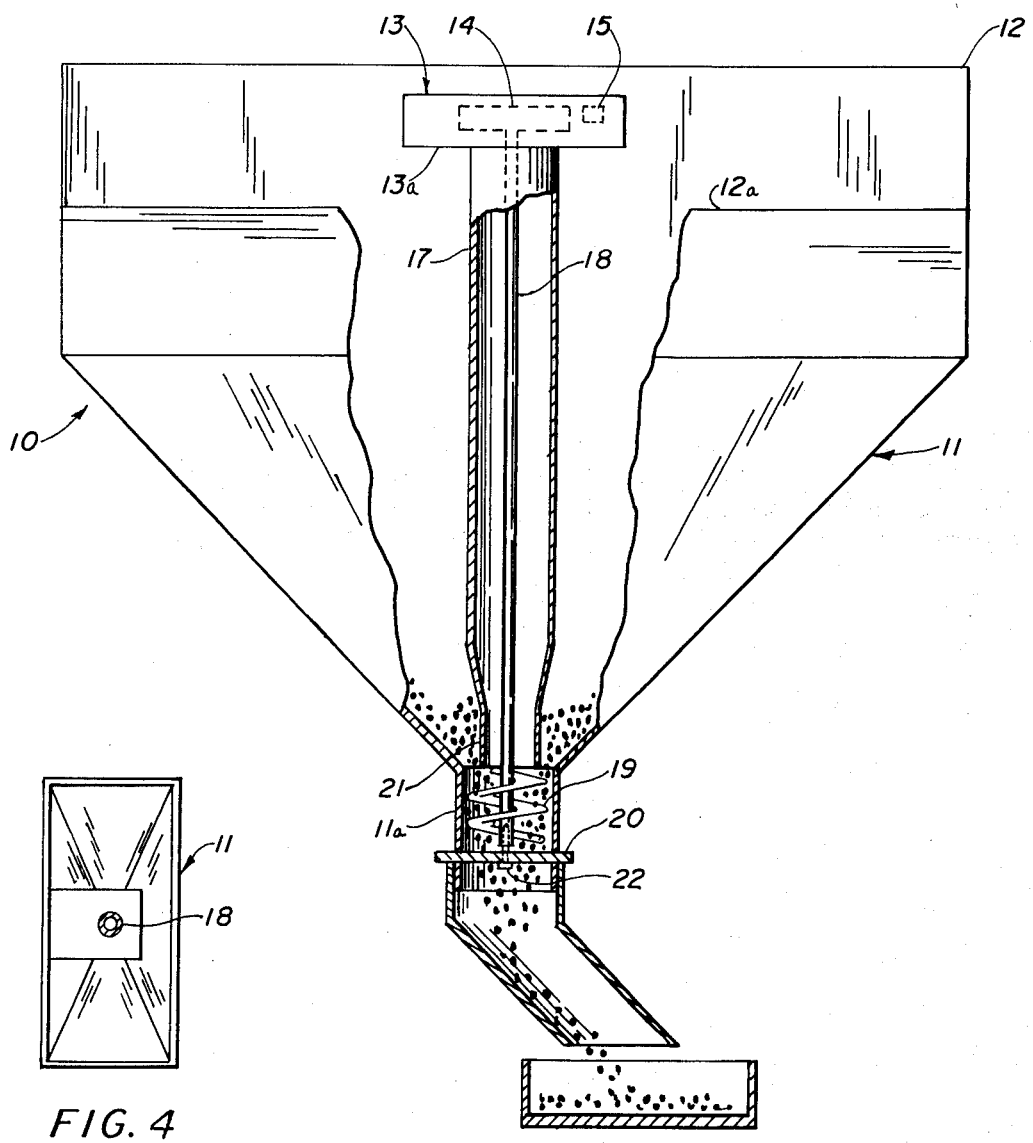
FIG. 1
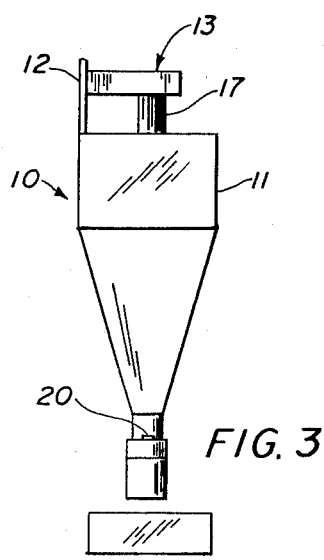
FIG. 4
FIG. 3
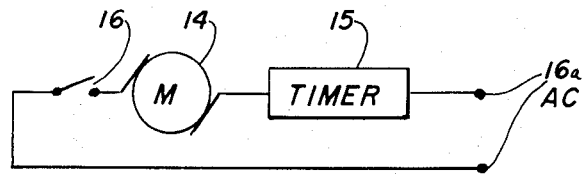
FIG. 2

AUTOMATIC LIVESTOCK FEEDER

This invention relates to feed bins, and more particularly, to an automatic livestock feeder.

It is, therefore, the principal object of this invention to provide an automatic livestock feeder, which will effectively dispense a predetermined amount of feed, once or twice a day, depending on the needs of the animals.

Another object of this invention is to provide an automatic livestock feeder, which will have an electric timer, that will energize every twelve or twenty-four hours, so as to rotate the worm shaft of an electric motor a desired number of revolutions, to dispense a predetermined amount of feed from a storage bin.

A further object of this invention is to provide an automatic livestock feeder, which will have the worm shaft of the motor within a sleeve, that will be within the feed of the storage bin of the feeder.

Other objects are to provide an automatic livestock feeder, which is simple in design, inexpensive to manufacture, rugged in construction, easy to use, and efficient in operation.

These, and other objects, will be readily evident, upon a study of the following specification, and the accompanying drawings, wherein:

FIG. 1 is a front view of the present invention, shown in elevation and partly broken away;

FIG. 2 is a schematic wiring diagram of the invention;

FIG. 3 is a side view of FIG. 1, shown on a smaller scale, and

FIG. 4 is a top plan view of FIG. 3.

According to this invention, an automatic livestock feeder 10 is shown to include a feed storage bin 11, of semi-conical configuration, fabricated of metal or other suitable material. A back plate 12 is integral of, and extends upwards from, the opening 12a of bin 11. Secured in a suitable manner (not shown) to back plate 12 is a housing 13, in which is suitably mounted an electric motor 14, that is series wired with a timer 15, and an on-off switch 16, the terminals 16a being connected to an A.C. current source, as shown in FIG. 2.

A plastic sleeve 17 is secured fixedly, at one end, in a suitable manner (not shown), to the underside 13a of housing 13, and houses the worm shaft 18 against the feed that is placed in bin 11. The worm portion 19, of worm shaft 18, is below the neck portion 21 of sleeve 17, and is rotatable in the neck 11a and bin 11, so as to push the feed through the neck 11a where it will pass downward past the narrow bar 20 to which is fixedly secured the shaft 18 by a tempered screw 22.

While various changes may be made in the detail construction, it is understood that such changes will be within the spirit and scope of the present invention, as is defined by the appended claims.

What I now claim is:

1. An automatic livestock feeder, comprising in combination, a downwardly converging feed-receiving bin, an upwardly extending back plate fixedly secured to a rear side of said feed-receiving bin, an electric motor and a timer secured inside a housing mounted to a front side of said back plate at an elevation higher than an upper edge of said bin, and a downwardly extending worm shaft secured at its upper end to said motor, and a lower end thereof extending into a tubular neck formed below a lower converging end of said bin, and an interior of said neck communicating with an interior of said bin, a worm formed on a lower portion of said shaft that extends below said bin converging end; said worm accordingly being inside said tubular neck, an axially extending, tapered screw extending downwardly from a terminal lower end of said shaft, a transversely extending, narrow bar through a longitudinally intermediate portion of said tubular neck, a bearing opening through said bar receiving a shank of said screw for rotation therein, and a sleeve fixedly secured to a bottom of said housing, extending downwardly to said converging end of said bin, said sleeve having a central opening, said sleeve being concentrically positioned around said shaft, and spaced therefrom by an interior opening of said sleeve being larger than a diameter of said shaft, said sleeve forming a shield preventing feed placed in said bin from contacting said shaft, and a circular discharge opening for said feed being formed between an outer side of said lower end of said sleeve and a wall of said bin around said converging end thereof, said feed discharged from said opening into said tubular neck where a diameter of said worm fits said neck opening and rotation of said worm moves said feed downwardly through said tubular neck around opposite side edges of said narrow bar extending transversely through said neck.

* * * * *